United States Patent [19]
Littman et al.

[11] 3,903,272
[45] Sept. 2, 1975

[54] MICROBIOCIDE PROCESS AND COMPOSITION EFFECTIVE AGAINST SULFATE REDUCING BACTERIA WATERFLOODING OPERATIONS

[75] Inventors: Emanuel S. Littman, Houston; Harold C. Noe, Jr., Sugar Land, both of Tex.

[73] Assignee: Nalco Chemical Company, Oak Brook, Ill.

[22] Filed: Apr. 2, 1973

[21] Appl. No.: 347,028

[52] U.S. Cl. ............................................. 424/218
[51] Int. Cl.$^2$ .......................................... A01N 9/36
[58] Field of Search ..................... 424/218; 260/954

[56] References Cited
UNITED STATES PATENTS

| | | | |
|---|---|---|---|
| 2,177,757 | 10/1939 | Vanderbilt | 260/954 |
| 2,535,175 | 12/1950 | Tawney | 260/954 |
| 2,964,528 | 12/1960 | Wicker et al. | 260/954 |
| 3,030,404 | 4/1962 | Schrader | 260/954 |

*Primary Examiner*—Albert T. Meyers
*Assistant Examiner*—D. W. Robinson
*Attorney, Agent, or Firm*—John G. Premo; John S. Roberts

[57] ABSTRACT

A microbiocidal composition and process for inhibiting the growth of sulfate reducing bacteria in aqueous operations related to waterflooding and secondary recovery of petroleum from subterranean, oil-bearing formations which comprises utilizing as an active ingredient 2-nitrobutyl alcohol phosphate (2-NBA). This phosphate monoester is prepared in a molar excess of polyphosphoric acid and the final pH is regulated to an acid pH of 1–3. Stability and water solubility are imparted by the in situ formation of a substantial amount of a lower alkanol phosphate ester such as isopropanol phosphate also utilizing polyphosphoric acid as the phosphating agent. Finally a lower alkanol solvent is added which is selected from isopropanol and methanol. Both the alkanol phosphate ester and alkanol solvent serve to stabilize and solubilize the active ingredient. The concentration of the isopropanol or the methanol solvent is adjusted to about 20–60% by weight of the total composition with a preferred composition of 40%. In waterflooding use, the active ingredient biocide is applied in a concentration of 2–25 ppm and a preferred concentration of about 15–25 ppm.

5 Claims, No Drawings

MICROBIOCIDE PROCESS AND COMPOSITION EFFECTIVE AGAINST SULFATE REDUCING BACTERIA WATERFLOODING OPERATIONS

This invention, in general, relates to processes and compositions for destroying sulfate reducing microorganisms in an aqueous environment. The invention is particularly useful in the treatment of fluids utilized in waterflooding operations in the secondary recovery of petroleum from subterranean, oil-bearing formations.

In its broader aspects, the invention pertains to the destruction of said microorganisms by bringing them into intimate contact in an aqeous environment with 2-nitrobutyl alcohol phospate (2-NBA).

Among the most difficult species of bacteria to control are the well-known sulfate-reducing bacteria, when their environment is composed of water containing relatively large amounts of dissolved inorganic salts. Under these environmental conditions, very few microbiocides will show any inhibition of sulfate-reducing bacteria or other microorganisms regardless of the dosage at which they are employed. Also, the few compounds found to be effective often require relatively large dosages in order to give satisfactory results, thereby increasing the cost of treating large quantities of water. It is known that most of the microbiocides are toxic to humans and animals in high concentrations, and for this reason it is considered important to avoid the use of highly toxic compounds in any concentration and to use the less toxic compound in as low concentrations as possible. See, for example, the discussion by R. C. Allred, "The Role of Microorganisms," Producers Monthly, Vol. 18, No. 4, page 18.

The most difficult problem associated with sulfate-reducing bacteria is in high brines which are frequently encountered in the process known as waterflooding.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the waterflooding process wherein water is pumped under pressure into what is called an "injection well" and oil, along with quantities of water that have been displaced from the formation, are pumped out of an adjacent well, usually referred to as a "producing well." The oil which is pumped from the producing well is then separated from the water that has been pumped from the producing well, and the water is pumped to a storage reservoir from which it can again be pumped into the injection well. Supplementary water from other sources may also be used in conjunction with the produced water. When the storage reservoir is open to the atmosphere and the oil is subject to aeration, this type of waterflooding system is referred to herein as an "open waterflooding system". If the water is recirculated in closed system without substantial aeration, the secondary recovery method is referred to herein as a "closed flooding system."

The water which is introduced into the injection wells may vary considerably in composition from one field to another. Frequently it contains relatively large quantities of dissolved salts such as sodium chloride and therefore can be described as a brine. It may also contain other salts such as those of calcium, magnesium, barium, and strontium. Some iron salts may likewise be present. In some cases these salts are added to a fresh water to prevent clay minerals from swelling and sealing off porous oil sands, but in most instances their occurrence is natural.

Certain sulfate reducing strains or species of the Genus Clostridium are often even more difficult to control than the Desulfovibrio. The Clostridia are not only difficult to control in the vegetative stage, but they also have the ability to form a chemically resistant protective spore when in contact with unfavorable environmental conditions. Consequently, even when the more common sulfate reducers are killed, Clostridia may remain viable and produce quantities of hydrogen sulfide sufficient to cause problems in the waterflood system.

Another serious problem encountered in waterflooding processes is the growth of facultative aerobic bacteria characterized by a highly viscous mucoid outer layer or capsule surrounding each cell. These organisms are popularly referred to as "slime-forming" bacteria as a result of the common and habitual tendency of many such cells to clamp together to form gelatinous, gummy masses of varying sizes. The masses cause infinite harm to waterflooding processes by furnishing a protective covering to colonies of sulfate-reducing bacteria, thereby providing the anaerobic organisms with more ideal growth conditions in systems containing oxygen. Also, the masses of these organisms frequently are responsible for the fouling of equipment such as pumps, filters, and pipelines used to transport the fluid in waterflood systems and may plug the subterranean formation into which such fluid is being injected to such an extent as to prevent the waterflooding process from accomplishing its objectives.

Another serious problem encountered in present waterflooding processes is that many of the most effective antimicrobial agents now known are chemicals containing heavy metals or halogenated aromatic compounds or paraffinic hydrocarbons. It is well known that such compounds, if carried by the waterflooding process into petroleum-bearing formations, may become solubilized in or adsorbed to the oil which is later produced. When these compounds remain present in the crude oil, they present serious and expensive problems in oil refining processes.

In the treatment of secondary waters or injection waters by chemicals described as biocidal inhibitors or bacterial inhibitors, J. B. Davis, Petroleum Microbiology, Elsevier, 1967, at page 475, lists the following general types:

Amines
Polychlorophenols
Quaternary ammonium compounds
Formaldehyde

Additionally, at page 472, he specifically itemizes:

A mixture of a chlorinated phenol and amine
An inorganic sulfur compound
A mixture of a quaternary ammonium compound and primary amine
Imidazoline
A mixture of a chlorinated phenol, an amine, and imidazoline In a previous monograph, E. Beerstecher, Petroleum Microbiology, Elsevier, 1954, at page 265, Beerstecher compares the effect of certain bacteriacides on the growth of sulfate-reducing bacteria and shows:

Phenyl mercuric lactate
Lauryl pyridinium chloride
Sodium pentachlorophenate
Formaldehyde
Lauryl dimethyl benzyl ammonium chloride It is noted that none of the above compounds is structurally similar to the present active compound, which is a nitroalcohol derivative; namely, 2-nitrobutyl alcohol phosphate. The lack of direction in the prior art compounds is probably due to the quest for a one-shot biocide which would be applicable to all microorganisms wherein the present invention is targeted to sulfate-reducing anaerobic bacteria.

The present formulation embodying a phosphate monoester of 2-nitro butanol differs from several of the prior art compounds which are surfactants and surfactants cause difficulty in the aqueous stream and in the filtering. Such surfactants are exemplified by the amines and the quaternary compounds.

The present phosphate ester of 2-NBA, in addition to microbiocidal qualities, has advantages including a low molecular weight and lack of adverse effect on water quality with respect to injectivity into tight formations. It was additionally found that this composition was effective in an acid surrounding or in the free acid form of phosphate ester. Salts as alkali metal salts were prepared and all were unstable and did not show the biocidal effectiveness of the acid ester.

FORMATION OF 2-NITROBUTYL ALCOHOL PHOSPHATE (2-NBA)

Phosphoric acid esters of nitroalcohols are taught generally in U.S. Pat. No. 2,177,757 Vanderbilt (Commercial Solvents) where the patentee used $POCl_3$ and $PCl_5$ as phosphating agents to produce mono-, di-, and tri-substituted products. In the present invention, due to the fragility and insolubility of the particular nitroalcohol, reactant utilized, neither the prior art phosphating agents nor orthophosphoric acid are satisfactory, and therefore the present invention utilizes a polyphosphoric acid containing a condensed phosphoric acid as a phosphating agent.

POLYPHOSPHORIC ACID REACTANT

As a reactant for esterification of both the nitroalcohol and the alkanol, the present invention critically uses a polyphosphoric acid which gives esterification advantage over other known phosphating reactants such as orthophosphoric acid. In a polyphosphoric acid, a mixture of condensed phosphoric acids, there is a higher $P_2O_5$ value (up to 91.1/92.1% $P_2O_5$ versus 72.4% $P_2O_5$) for orthophosphoric acid, and it is this ratio of $P_2O_5$ values which gives rise to the current commercial expression 115% polyphosphoric acid, meaning 115% of the $P_2O_5$ value for orthophosphoric acid, $H_3PO_4$.

In the polyphosphoric acids utilized, the condensed phosphoric acids such as metaphosphoric $H_2O.P_2O_5$ and pyrophosphoric acid $2H_2O.P_2O_5$ show less water bound in the molecule than with orthophosphoric acid $(3H_2O.P_2O_5)$. One conventional method of producing orthophosphoric acid utilized is to heat orthophosphoric acid with $P_2O_5$ to eliminate water. A showing of different commercial polyphosphoric acids is set out in Table 12-4, of Van Wazer, Phosphorus and Its Compounds, Volume 1, Interscience, 1966, Page 775.

In the two mono-esterification reactions (a) with the nitroalcohol and (b) with the isopropanol, the polyphosphoric acid is designated as the key reactant in that the alcohols are added sequentially to the polyphosphoric acid utilized. In addition, the polyphosphoric acid creates in situ the desired acid pH of 1–3 found necessary in the reactions.

PREPARATION OF ISOPROPYL PHOSPHATE ESTER

In the second esterification stage, isopropyl alcohol at least equal to the amount of nitroalcohol utilized is added to the reaction mix to form isopropyl phosphate. The presence of this ester, in addition to the phosphate ester of the active ingredient, has been found necessary for stabilizing the solvent purposes, and the formation of the two monoesters has been verified by temperature rise calculation typical of this type of esterification reaction. Thus, at least an equimolar amount of isopropyl phosphate as compared with 2-NBA phosphate is necessary for the present invention.

THE LOWER ALKANOL SOLVENT

Additionally, for purposes of use as a waterflooding biocidal composition, a lower alkanol solvent is added to the composition and the amount of solvent is adjusted to about 20–60% by weight of the total composition. By definition in the present specification and claims, the term lower alkanol is defined as a $C_1$–$C_6$ alkanol and of this group a marked superiority was noted in using either methanol or isopropanol as a diluent in the formulation of the composition after the preparation of the isopropyl phosphate ester.

PRODUCT FOR WATERFLOODING

It was further noted that the intermediate product of the NBA phosphate ester per se was a solid, extremely acid, and unstable when formulated into a liquid product. Only by formation of the additional isopropyl phosphate and the addition of substantial amounts of an alkanol solvent selected from isopropanol and methanol was a satisfactory formulation obtained for use in waterflooding.

The present formulation with 40% isopropanol as a solvent has the following characteristics:

| | |
|---|---|
| Color: | Dark amber |
| Odor: | Mildly pungent |
| Specific gravity: | 1.25 at 60°F |
| Density: | Approximately 10 lbs/gal at 60°F |
| Pour Point: | −20°F |
| Flash Point (TOC): | 140°F |
| Viscosity: | 435 centepoises (75°F) |
| pH: | <1.0 as supplied (1.0–3.0) |

Hereinafter in the specification and claims composition A is intended to be a composition according to Example 1 wherein the diluent or solvent is isopropyl alcohol adjusted to 40% by weight of the total composition.

The active ingredient for utilization in waterflooding is utilized in a concentration of 2–25 ppm and a preferred concentration of 15–25 ppm.

EXAMPLE 1A

To 3.25 moles of polyphosphoric acid (115%) were added sequentially (a) 2.5 moles of 2-NBA and (b) 8.3 moles of isopropanol. Theory and practice indicated that it required about one-third more of the alcohol reactants to monoesterify polyphosphoric acid than the actual molar requirements. In (a) 2.5 moles of 2-NBA reacted with 2.5 moles of polyphosphoric and one-third of the acid requirements, or 0.75 moles, became phosphoric acid. (b) In the second esterification, 5.15 moles of the polyphosphoric were utilized to provide 3.44 moles actually reacted to produce the isopropanol ester and 1.71 moles phosphoric acid. Of the 8.4 moles of isopropanol, the excess was used for solvation purposes. The technique utilized was to add first the nitroalcohol and then the isopropanol slowly to the polyphosphoric acid and the end result was an acid solution of a pH about 1 containing the active ingredient in the more stable phosphate ester form as well as a substantial amount of the isopropyl alcohol ester, free orthophosphoric acid, and free isopropanol. The concentration of the product was adjusted to provide 40% solvent or carrier where the carrier was selected from isopropanol and methanol.

A. 3.25 moles polyphosphoric acid (115% commercial grade)
   2.50 moles 2-NBA → 2.50 moles 2-nitrobutyl phosphate and 0.75 moles orthophosphoric acid
B. 5.15 moles polyphosphoric acid (115% commercial grade)
   3.44 moles isopropanol → 3.44 moles isopropyl phosphate and 1.71 moles orthophosphoric acid
C. Additional isopropanol, about 3.96 moles then added as a solvent.

The desired concentration of the isopropanol or lower alkanol as a solvent or diluent is adjusted to 20–60% by weight based on the total composition or concentrate for use in aqueous waterflooding.

EXAMPLE 1B

In subsequent runs polyphosphoric acid containing condensed phosphoric acids of varying strengths ranging from a $P_2O_5$ percentage from about 88–92 were utilized and all were effective as phosphating agents.

In the following examples a composition was utilized as taught in Example 1 utilizing 40% by weight isopropanol of the total composition as a diluent or solvent.

EXAMPLE 2

In the following test procedure
Composition A is the composition of the present invention prepared according to Example 1A with 40% isopropyl alcohol as a diluent;
Composition B is a mixture of amines wherein the primary active ingredient is a coco Duomeen acetate, 1-alkyl ($C_6$–$C_{18}$) amino-3-amino propane acetate.

A. API Sulfate-Reducing Culture
   2-day growth inhibition tests

| Day | Concentration Composition A | Composition B |
|---|---|---|
| 1 | < 5 ppm | 5–10 ppm |
| 2 | < 5 ppm | 15–25 ppm |
| 3 | 2.5–5 ppm | < 25 ppm |
| 4 | < 5 ppm | 10–15 ppm |

B. Time Kill - API Culture in Artificial Seawater

| Contact Time | | |
|---|---|---|
| 1 hour | < 50 ppm | 200–300 ppm |
| 24 hours | 1–5 ppm | 10–30 ppm |

C. Sulfate-Reducing Culture from Phillips Petroleum, La Conchita, California

| | | |
|---|---|---|
| 2-day inhibition | 5–10 ppm | > 25 ppm |

D. Time Kill in Artificial Seawater — Sulfate-Reducing Culture from Phillips Petroleum, La Conchita, California

| Contact Time | | |
|---|---|---|
| 1 hour | 70–100 ppm | 100–200 ppm |
| 24 hours | 0–10 ppm | 30–50 ppm |

E. Organisms from Arco Petroleum, Farmington, New Mexico

| | | |
|---|---|---|
| 2-Day inhibition | 10–15 ppm | >≡ppm |

The testing procedures utilized followed those of American Petroleum Institute RP-38, Second Edition, December 1965, "Testing Procedures for Biological Analysis for Subsurface Injection Waters." The API S.R. sulfate-reducing bacteria is a strain of Desulfovibrio, which is a species from the test culture of sulfate-reducing bacteria designated as Mid-Continent Strain A by the American Petroleum Institute Study Committee on Biological Analysis of Water to be used for Waterflood Purposes.

From the results above, it appears that at low concentrations in the effective usable range against sulfate-reducing bacteria, the composition of the present invention showed advantage over a typical amine-type biocide.

EXAMPLE 3

Effect of Metal Contact

| Composition A* | 2-Day Inhibition API Sulfate-Reducing Culture Mid-Continent Strain A |
|---|---|
| Stainless Steel | |
| 75:25[1] | 1–5 ppm |
| 50:50 | 2.5–5 ppm |
| 25:75 | <10 ppm |
| Aluminum | |
| 75:25 | 1–5 ppm |
| 50:50 | 2.5–5 ppm |
| 25:75 | <10 ppm |
| Mild Steel** | |
| 75:25 | 1–5 ppm |
| 50:50 | 2.5–5 ppm |
| 25:75 | 10–15 ppm |
| Composition A—No Control | 1–5 ppm |

*Composition A is the composition of the present invention prepared according to Example 1A with 40% isopropyl alcohol as a diluent.
**Gas formation occurred between mild steel and biocide. Specimens became pitted and scaled with significant weight loss.
[1]Ratio of Biocide to water of dilution.

In this procedure biocide water ratios were contacted with clean coupons of stainless steel, aluminum, and mild steel for three days at room temperatures. No reaction was noted between biocide and stainless steel or aluminum, and no weight loss of metal occurred. From the results above, it appears that the present biocide composition has no effect on stainless steel or aluminum but does affect mild steel.

EXAMPLE 4

In comparison testing of Composition A with biocide products B, C. and D,
- A is the composition of the present invention prepared according to Example 1A with 40% isopropyl alcohol as a diluent;
- B is the amine designated B of Example 1A plus a chlorinated phenol;
- C is 3-alkoxy-2-hydroxy-n-propyl trimethyl ammonium chloride;

The following results were achieved on a 48-hour inhibition utilizing again the API sulfate-reducing bacteria.

BIOCIDE TEST USING
API SULFATE-REDUCING BACTERIA
(MID-CONTINENT STRAIN A)

| Chemical | 48-Hour Inhibition Effective Concentration |
|---|---|
| A | 10–15 ppm |
| B | 5–10 ppm |
| C | 10–15 ppm |

Results: Composition A is equivalent to C, a quaternary compound. Composition A showed slightly less effectiveness than B, which was the Duomeen acetate plus a chlorinated phenol, at levels which would be operational in waterflooding against a typical sulfate-reducing bacteria strain.

The embodiments of this invention in which an exclusive right or privilege is claimed are defined as:

1. A microbicidal composition for use in waterflooding to inhibit growth of sulfate-reducing bacteria consisting essentially of a mixture of a bactericidal amount of 2-nitrobutanol phosphate, at least an equimolar quantity of isopropyl phosphate, and 20–60% by weight of the composition being a $C_1$–$C_6$ lower alkanol carrier.

2. The composition according to claim 1 wherein said carrier is present in an amount of about 40% by weight of the composition.

3. The composition according to claim 1 wherein the alkanol carrier is isopropanol.

4. The composition according to claim 1 wherein the carrier is methanol.

5. A process for destroying sulfate-reducing bacteria in an aqueous environment which comprises contacting said microorganisms with a bactericidally effective amount of the composition of claim 1.

* * * * *